United States Patent
Tartan et al.

(10) Patent No.: US 11,391,977 B2
(45) Date of Patent: Jul. 19, 2022

(54) METHOD AND APPARATUS FOR CONTROLLING LIQUID CRYSTAL STATES

(71) Applicant: Oxford University Innovation Limited, Oxford (GB)

(72) Inventors: Chloe C. Tartan, Oxford (GB); Patrick S. Salter, Oxford (GB); Martin J. Booth, Oxford (GB); Steve J. Elston, Oxford (GB); Stephen M. Morris, Oxford (GB)

(73) Assignee: OXFORD UNIVERSITY INNOVATION LIMITED

( * ) Notice: Subject to any disclaimer, the term of this patent is extended or adjusted under 35 U.S.C. 154(b) by 0 days.

(21) Appl. No.: 16/650,123

(22) PCT Filed: Sep. 26, 2018

(86) PCT No.: PCT/GB2018/052732
§ 371 (c)(1),
(2) Date: Mar. 24, 2020

(87) PCT Pub. No.: WO2019/063993
PCT Pub. Date: Apr. 4, 2019

(65) Prior Publication Data
US 2020/0278575 A1 Sep. 3, 2020

(30) Foreign Application Priority Data
Sep. 26, 2017 (GB) ..................................... 1715566

(51) Int. Cl.
*G02F 1/1333* (2006.01)
*G02F 1/139* (2006.01)

(52) U.S. Cl.
CPC ...... *G02F 1/133365* (2013.01); *G02F 1/1395* (2013.01); *G02F 2202/36* (2013.01)

(58) Field of Classification Search
CPC .......... G02F 1/1334; G02F 1/137; G02F 1/13; G02F 1/1395; G02F 1/1343;
(Continued)

(56) References Cited

U.S. PATENT DOCUMENTS

2001/0052961 A1\* 12/2001 Towler .................. G02F 1/1395
349/177
2010/0051194 A1 3/2010 Chien et al.
(Continued)

OTHER PUBLICATIONS

International Search Report and Written Opinion for PCT/GB2018/052732, dated Jan. 10, 2019, pp. 1-10.
(Continued)

*Primary Examiner* — Thoi V Duong
(74) *Attorney, Agent, or Firm* — Thomas|Horstemeyer, LLP

(57) ABSTRACT

A method is disclosed of electrically controlling state transition of a liquid crystal material in a device (200). The device (200) comprises the liquid crystal material (213) and a polymeric structure (210) consisting of polymerised liquid crystal material with a selected liquid crystal state. The method comprises: applying an electric field to the liquid crystal material (213) to force the liquid crystal material (213) into a high-energy state; reducing the strength of the electric field to cause a lower-energy state region of the liquid crystal material (213) to nucleate on at least a part of the polymeric structure (210).

20 Claims, 10 Drawing Sheets

(58) Field of Classification Search
CPC ..... G02F 1/133365; G02F 2001/13775; G02F 2202/022; G02F 2202/36; G02F 1/13775; C09K 19/00
See application file for complete search history.

(56) References Cited

U.S. PATENT DOCUMENTS

2010/0091222 A1* 4/2010 Swager ................ G02F 1/1334
349/88
2014/0016064 A1 1/2014 Munoz et al.
2020/0339883 A1* 10/2020 Han ....................... C07C 69/54

OTHER PUBLICATIONS

UK Search Report for GB 1714748.9, dated Mar. 23, 2018, pp. 1-4.
P. Rudquist et al: "Volume-stabilized ULH structure for the flexoelectro-optic effect and the phase-shift effect in cholesterics", Liquid Crystals, vol. 24, No. 3, Mar. 1, 1998 (Mar. 1, 1998), pp. 329-334.
RSC Adv., 2017.7.507, Jan. 3, 2017, Tartan et al., "Generation of 3-dimensional polymer structures in liquid crystal devices using direct laser writing", p. 507-511.

* cited by examiner though it may be a meta-stable state. The intermediate state may be the transient twisted (T) state.

METHOD AND APPARATUS FOR CONTROLLING LIQUID CRYSTAL STATES

CROSS-REFERENCE TO RELATED APPLICATIONS

This application is the National Stage of International Application No. PCT/GB2018/052732, filed Sep. 26, 2018, which claims priority to GB 1715566.4, filed Sep. 26, 2017, which are entirely incorporated herein by reference.

TECHNICAL FIELD

The present invention relates to liquid crystal devices, and in particular but not exclusively, to a method for electrically controlling defects in liquid crystal devices.

BACKGROUND

Liquid crystal devices are used in a wide range of applications, including in display devices. The state of liquid crystals may be controlled by the application of an electric field. Different states of liquid crystal may exhibit different optical properties—a transition between a first and second state may change the transmission properties through a liquid crystal cell.

In many applications, the speed of switching is an important factor. For example, low latency displays are much in demand, both as high performance monitors (where high refresh rates and low latency are desirable properties) and in VR displays, where latency can contribute to a risk of motion sickness.

In other applications is may be desirable to change the state of only a proportion of liquid crystal material in a cell (or other structure). Presently this may be achieved by using more than one set of electrodes to apply different electrical fields across different regions of liquid crystal, so as to achieve a controlled partial state transition. If this partial state transition is to be controllable with a high degree of control, a relatively large number of electrodes may be required.

A method of controlling state transition in liquid crystal devices that overcomes or ameliorates at least some of the above problems is desirable.

SUMMARY

According to a first aspect of the invention, there is provided a method of electrically controlling state transition of a liquid crystal material in a device comprising the liquid crystal material and a polymeric structure consisting of polymerised liquid crystal material with a selected liquid crystal state, the method comprising:
  applying an electric field to the liquid crystal material to force the liquid crystal material into a high-energy state;
  reducing the strength of the electric field to cause a lower-energy state region of liquid crystal to nucleate on at least a part of the polymeric structure.

A defect may separate the lower-energy state region from the material having a high energy state; and the method may comprise controlling the position and/or shape of the defect by modifying the strength of the applied electric field.

This may facilitate a faster method for controlling the state of a liquid crystal material in a device, and/or an alternative method of controlling state transition that can affect partial transition with a high degree of control.

The selected state may be a ground state.

Controlling the position and/or shape of the defect may comprise varying the relative proportions of liquid crystal material in a high-energy and a lower energy state.

The device may be a pi-cell liquid crystal device.

The liquid crystal material may comprise one of a nematic liquid crystal material, a chiral nematic liquid crystal material, a blue phase liquid crystal material, a smectic-A liquid crystal material, and a twisted nematic liquid crystal material. The high-energy arrangement of the liquid crystal material may be a bend (V) state.

The lower-energy state of the liquid crystal material may be one of two asymmetric splayed ($H_{a1}$, $H_{a2}$) states. A defect may be formed between the high-energy state and the lower-energy state as a result of the nucleation of the lower-energy arrangement on the polymeric structure in the device. The defect may be a disclination line, or a point defect, or a defect state in a nematic liquid crystal material, or a defect state in a twisted nematic liquid crystal material, or a defect state in a chiral nematic liquid crystal material, or a defect state in a smectic-A liquid crystal material, or a defect state in a blue phase liquid crystal material. The defect may be between left-twisted and right-twisted Grandjean textures. The method may comprise controlling defect states in twisted nematic LCs and focal conic and uniform smectic A LCs.

The position of the defect may be controlled by modifying the strength of the applied electric field. The growth or reduction of the lower-energy arrangement may be controlled by controlling the position of the defect.

The polymeric structure may be formed by polymerising liquid crystal material using direct laser writing (e.g. using a two-photon absorption mechanism). At least part of the polymeric structure may be formed by polymerising liquid crystal material under the application of an electric field to lock in a high-energy state to the polymeric structure (e.g. the same high energy state that results from applying an electric field to the liquid crystal material). At least part of polymeric structure may be formed by polymerising liquid crystal material without the application of an electric field to lock in a ground state. The ground state may be the splayed (H) state.

The regions of polymeric structure that are polymerised without the application of an electric field will have a ground state locked in. When electric field applied to such a device is reduced, the lower-energy arrangement will nucleate on the regions of the polymeric structure that are locked in the ground state.

The presence of ground state regions of the polymeric structure may assist in state transition from a high energy state (such as a bend state V, or an asymmetric H state, $H_a$) to a lower energy state (such as a ground H state). If the polymeric structure were not present, the liquid crystal material would relax from the high-energy arrangement to the lower-energy arrangement via an intermediate-energy arrangement. This intermediate-energy arrangement may be the transient twisted (T) state. This additional step in the relaxation of the liquid crystal material may cause switching of prior art devices from high-energy arrangement to the ground state arrangement to be slower, which may be problematic. The polymeric structure may facilitate direct transition between the high energy state and a low energy state such as a ground state. The intermediate state may be energetically incompatible with the polymeric structure.

The method may comprise moving particles suspended in the liquid crystal material using the defect (e.g. colloidal particles). The particles may comprise (or consist of) conducting particles, and moving the particles may comprise forming a conducting path using the conducting particles. The particles may comprise (or consist of) chemical functionalisation, and moving the particles may comprise moving at least some of the particles to a reaction site where they participate in a chemical reaction. The particles may comprise particles exhibiting fluorescence, wherein particle fluorescence is controlled by controlling the position and/or aggregation of at least some of the particles. The particles may be configured to absorb light (for example for photovoltaic purposes).

In a second aspect of the invention, there a device comprising: liquid crystal material; at least one polymeric structure consisting of polymerised liquid crystal material with a selected state, electrodes for applying an electric field to the liquid crystal material, and a controller configured to:
- apply an electric field to the liquid crystal material using the electrodes to force the liquid crystal material into a high-energy state;
- reducing the strength of the electric field to cause a lower-energy state region of liquid crystal to nucleate on at least a part of the polymeric structure.

The device may comprise a cell comprising a first and second substrate and the liquid crystal material, the liquid crystal material forming a layer between the first and second substrate.

The electrode may be configured to apply an electric field in the plane of the liquid crystal material layer (e.g. using interdigitated electrodes, which may be on a single substrate), and/or transverse to the plane of the liquid crystal material layer (e.g. with an electrode on the first substrate and an electrode on the second substrate).

A defect may separate the lower-energy state region from the material having a high energy state; and the controller may be configured to control the position and/or shape of the defect by modifying the strength of the applied electric field.

The liquid crystal material may be a nematic liquid crystal material.

The liquid crystal material may be configured to be polymerisable, and the polymerised liquid crystal material may be the same type of material as the liquid crystal material except that the polymerised liquid crystal material is polymerised and the liquid crystal material is not polymerised.

The polymerised liquid crystal device may be polymerised by direct laser writing of the liquid crystal material, or may be polymerised via a photolithography process. The direct laser writing process may comprise aberration-corrected laser writing.

The polymerised liquid crystal material may comprise polymeric structures that fully extend through the thickness of the liquid crystal material, or may comprise polymeric structures that partially extend through the thickness of the liquid crystal material, or may comprise both polymeric structures that partially extend through the thickness of the liquid crystal material and polymeric structures that fully extend through the thickness of the liquid crystal material.

There may be a plurality of polymeric structures. At least some of the polymeric structures may be arranged concentrically. The polymeric structures may comprise at least one of: line type structures, pillar type structures, closed loop type structures (e.g. circular, square, rectangular etc.), and 3-dimensional polymer structures.

According to another aspect, there is provided a spatial light modulator comprising the device according to the second aspect, wherein the position and/or shape of the defect controls the degree of phase modulation, polarisation modulation or amplitude modulation imparted by the spatial light modulator.

According to another aspect, there is provided an adjustable Fresnel lens comprising a device according to the second aspect, wherein the polymerised liquid crystal is provided in a plurality of concentric regions.

The optional features from any aspect may be combined with the features of any other aspect, in any combination. For example, the method of the first aspect may comprise using a device that includes any of the features described with reference to the second aspect. Furthermore, the device of the second aspect may be configured to perform the method of the first aspect (including any optional features thereof).

BRIEF DESCRIPTION OF THE DRAWINGS

The invention will now be described by way of example with reference to the accompanying drawings in which.

Like reference numbers and designations in the various drawings indicate like elements.

Features which are described in the context of separate aspects and embodiments of the invention may be used together and/or be interchangeable wherever possible. Similarly, where features are, for brevity, described in the context of a single embodiment, these may also be provided separately or in any suitable sub-combination. Features described in connection with the method may have corresponding features definable with respect to the liquid crystal device and use of the liquid crystal device, and these embodiments are specifically envisaged.

DETAILED DESCRIPTION

All experimental results described herein were obtained by applying an AC electric field to each of the various example devices. In all cases described herein, the varying electric field was applied by varying the amplitude of a 1 kHz a.c. electric field.

Figure 1:
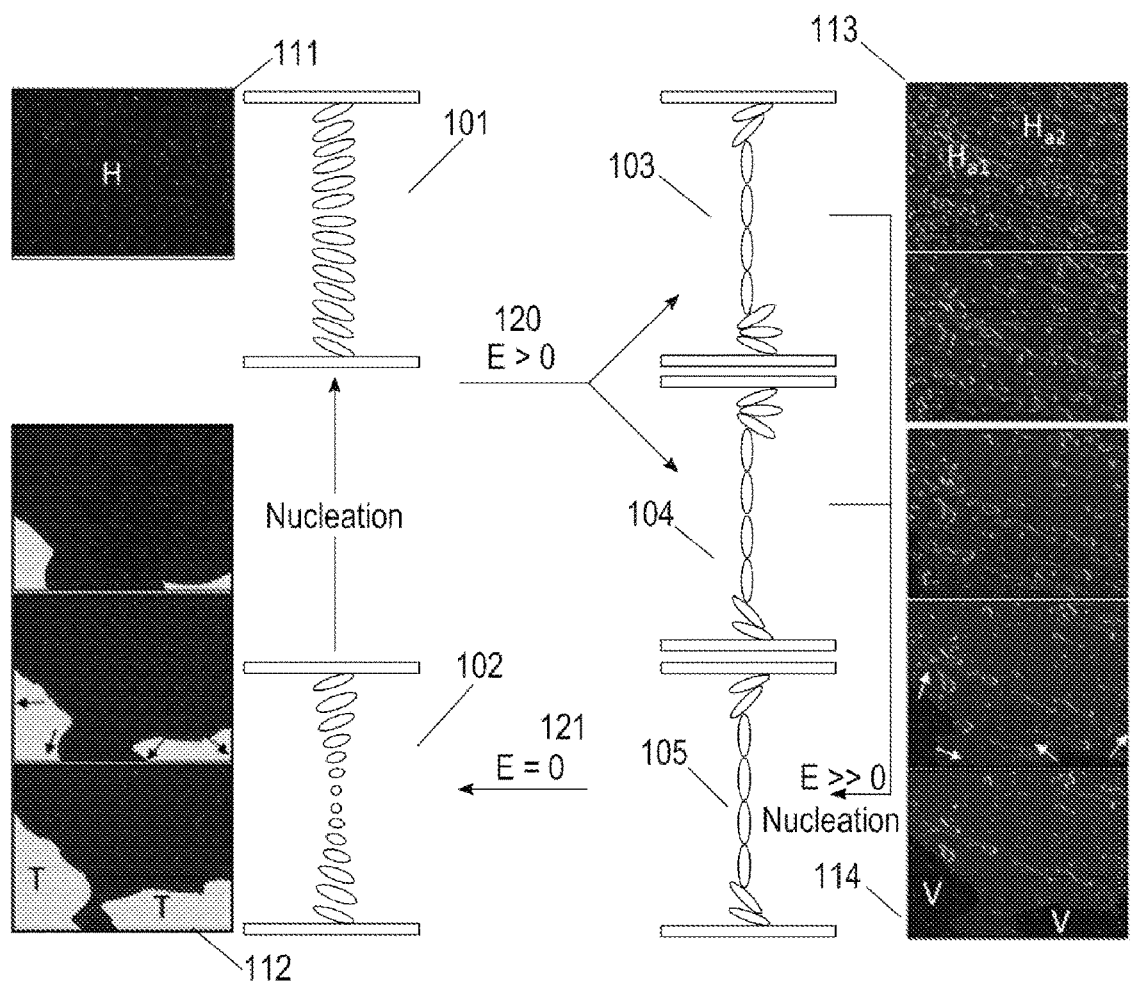
FIG. 1 shows states in a pi-cell under a range of applied electric fields.

FIG. 1 shows states in a pi-cell device under different applied electric fields. The pi-cell comprises electrodes by which an electric field may be applied across a liquid crystal material (e.g. through the thickness of a thin layer). Initially (in the image 111), the device is in the stable, lowest energy splayed (H) ground state 101, with no applied field.

Electrically addressing the device by applying a voltage between the electrodes results in an electric field being applied to the liquid crystal material. A voltage above a particular voltage threshold (~1V) leads to a transition 120 from the ground (H) state to one of the two optically equivalent asymmetric H ($H_{a1}$, $H_{a2}$) states 103, 104. At larger electrical field strengths, the device undergoes another transition 122 to a topologically distinct bend (V) state 105. The bend (V) state, otherwise known as the Optically Compensated Bend (OCB) mode, is mainly attributed to fast response times (in the sub-millisecond regime). However, due to the inherent instability of the bend (V) state, there is a multitude of literature concerned with different methods to stabilise the OCB mode for fast switching display applications. Upon removal of the electric field, regions of bend (V) alignment collapse to a topologically continuous transient twist (T) state, before the entire device eventually relaxes back to the lowest energy ground (H) state. The transition from V state to H state via the transient state T may be relatively slow.

Embodiments of the present disclosure employ electrically controllable defects that are generated from an engineered polymerised liquid crystal structure that has a specific, locked in, state (e.g. H, V, etc). Such polymerised liquid crystal structures may be generated by in-situ direct laser writing. In the examples provided herein, a high resolution, two-photon absorption based fabrication technique was employed to engineer polymeric structures of varying shapes and dimensions, but any process that produces similar structures may be used. The polymerised liquid crystal structures described herein extend through the thickness of the liquid crystal layer in the device, but partial thickness polymeric structures are also envisaged.

Polymerised liquid crystal structures may be written in the splayed ground (H) state, in the absence of an applied electric field, consequently possessing a planar tilted arrangement, or in the topologically discontinuous bend (V) state, under the application of an electric field in-situ. A more detailed description as to how to create such structure is found in Tartan, C. C., et al. "*Generation of 3-dimensional polymer structures in liquid crystalline devices using direct laser writing.*" *RSC Advances* 7.1 (2017): 507-511.

The applicant has found that, in devices according to an embodiment, which comprise a liquid crystal material in contact with a polymeric liquid crystal structure, controllable defects (e.g. disclination lines, point defects) may be formed by nucleation at the polymeric structure, and that the position and/or shape of these defects may be controlled by subsequently varying the electric field.

In a device comprising polymeric liquid crystal structures with a locked-in ground state, driving the device into the bend (V) state post-fabrication under the application of a sufficiently high electric field (such as 2 V/μm), and then gradually reducing the applied electric field, results in the formation of disclination lines due to the distinct alignment locked in the polymerised liquid crystal structures (in the splayed ground (H) state) and that of the bulk device when in the bend (V) state. Subsequently, perturbations in the applied electric field can be used to control the defects, for example, shrinking, growing or moving the defects as the field is reduced or increased respectively.

Figure 2:
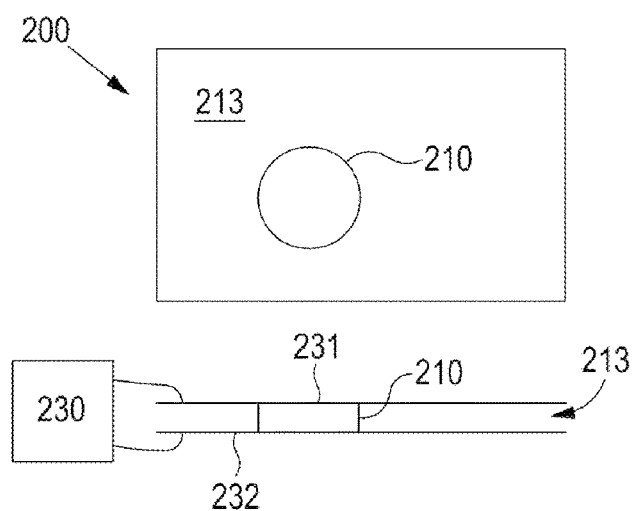
FIG. 2 shows a device according to an example embodiment.

FIG. 2 shows a top view and a side view of an example device 200 according to an embodiment, comprising a liquid crystal material 213, first substrate 231, second substrate 232, polymeric structure 210 and controller 230. The liquid crystal 213 may comprise any suitable liquid crystal material, such as a nematic liquid crystal mixture with a positive dielectric anisotropy e.g. E7, BL006 or 5CB (from Merck). A nematic liquid crystal liquid material was used in all the following example devices. However, the methods and example devices described herein are equally applicable to other types of liquid crystal material containing defects, such as chiral nematic liquid crystal material and blue phase liquid crystal material. The liquid crystal material 213 is disposed between the first substrate 231 and second substrate 232. The first and second substrate 231, 232 may be at least partially transparent (e.g. may comprise substantially transparent regions). The first and second substrate 231, 232 comprise electrodes (not shown) for applying a field on the liquid crystal device therebetween.

It is not essential that the liquid crystal be disposed between a first and second substrate, and in some embodiments the liquid crystal may be supported on a surface (e.g. a single surface). The first and second substrates, or the surface supporting the liquid crystal may comprise rigid material (e.g. glass) or may comprise flexible material (e.g. PET). Such a surface may comprise electrodes for applying an electric field to the liquid crystal material, and/or may retain the liquid crystal material due to capillary/wetting forces. The electrodes do not have to be part of the first and second substrate, or part of the surface, and do not have to be in physical contact with the liquid crystal material. The electrodes may comprise interdigitated electrodes in association with either first and second substrates or a single surface. In the case of a single surface supporting the liquid crystal material, an electric field may be applied in the plane of the surface (and therefore in the plane of the device) via the electrodes.

The liquid crystal material 213 may be loaded with a reactive material (such as reactive mesogen RM257 (Merck)) comprising a photoinitiator (such as Irgacure® 819) to make it photo-polymerisable, and the polymeric structure 210 may be formed from the liquid crystal material 213 in-situ, after the liquid crystal material 213 has been introduced to the device 200 (e.g. disposed between the first and second substrates 231, 232).

The controller 230 is configured to apply an a.c. electric field to the liquid crystal material 213, via the first and second substrate 231, 232. More specifically, the controller 230 is configured to apply a sufficient electric field to the liquid crystal material using the electrodes to force the liquid crystal material into a high-energy state, such as a V state. The controller is configured to subsequently reduce the strength of the electric field to cause a lower-energy state region of liquid crystal, such as an $H_a$ state, to nucleate on at least a part of the polymeric structure, with a defect separating the lower-energy state region from a region of the liquid crystal material with a high energy state. The controller is configured to subsequently control the position and/or shape of the defect by modifying the strength of the applied electric field, for example to modulate the proportion of liquid crystal material in the lower-energy state in response to a control signal.

A number of more specific example devices will be shown to demonstrate test results illustrating the concepts described herein. In each of these examples, the test device comprises a 5 μm thick, nematic pi-cell (polyimide alignment layers are rubbed in the same direction with ~5° surface pretilt), capillary filled with a photo-polymerisable liquid crystal mixture. The host liquid crystalline material was the eutectic E7 nematic mixture, provided by Merck Chemicals, Ltd., which has a positive dielectric anisotropy of $\Delta\varepsilon=13.7$ at T=20° C. and a birefringence of $\Delta n=0.219$ at $\lambda=632.8$ nm. The nematic host was made photo-polymerisable with the addition of 30 wt. % of the reactive mesogen RM257 and 1 wt. % of the photoinitiator IRG819, both also provided by Merck Chemicals, Ltd.

Figure 3:
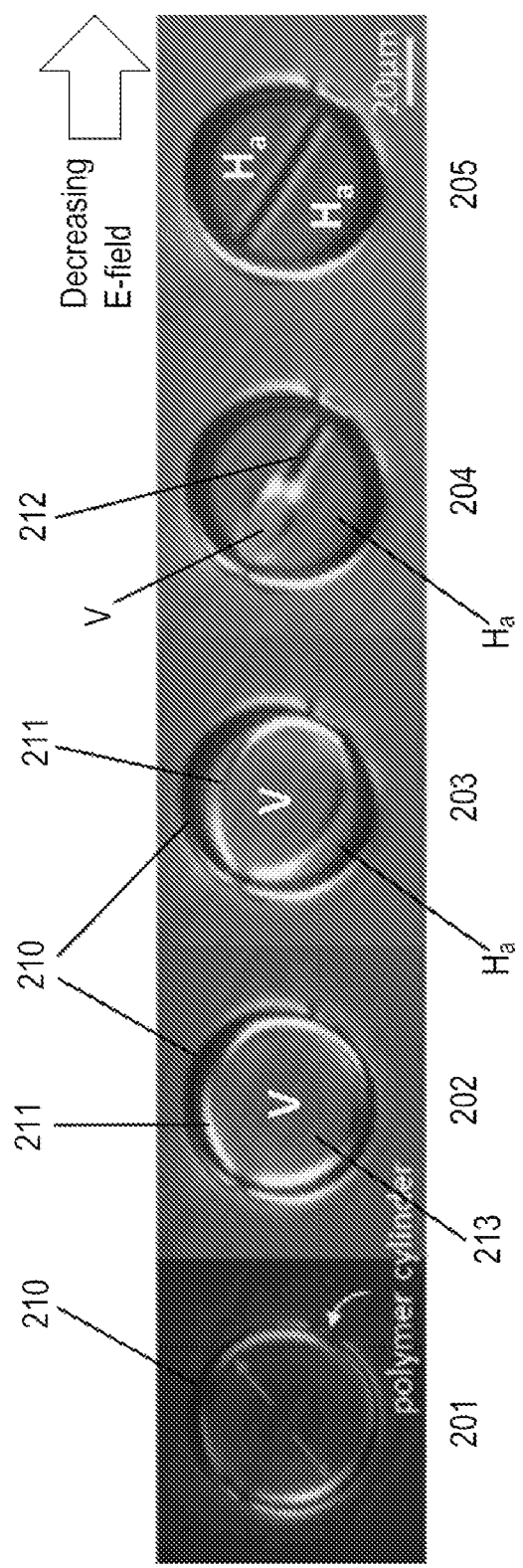
FIG. 3 shows a series of optical polarising microscope (OPM) images (taken between crossed polarisers) of an example embodiment, in which the polymeric structure is circular, as the position of a defect is adjusted by varying the amplitude of an electric field.

In a first example device, shown in FIG. 3, the polymeric structure 210 comprises cylinders which were fabricated while the device was in the splayed (H) ground state. The cylinders 210 comprise a number of different diameters (including 20, 30, 40 and 50 μm) and extend through the thickness of the liquid crystal layer, from the first substrate to the second substrate. In this example, the substrates are each glass substrates.

FIG. 3 shows a series of OPM images 201-205 of the first example device captured as the applied electric field was reduced from 2 V/μm to 0 V/μm. The OPM images show the evolution of the LC alignment (or state) within and around the polymeric structure (a 50 μm diameter polymeric cylinder) 210 written in the ground (H) state. The OPM images were captured as the electric field strength was reduced to 0 V/μm after the device was initially driven into the high-energy (V) arrangement by application of a large electric field (2 V/μm), as shown at 201. The bulk region enclosed within the polymeric structure 210 retains the high-energy (V) arrangement and the lower energy arrangement ($H_{a1}$, $H_{a2}$) nucleates from the polymeric structure 210 as the applied electric field is reduced, leading to the generation of two thin disclination lines 211 separating the topologically discontinuous states (lower-energy arrangement ($H_{a1}$, $H_{a2}$) and high-energy arrangement (V)). The disclination lines 211 can be controlled with small perturbations to the amplitude of the applied electric field, such that the emerging regions of lower-energy arrangement ($H_{a1}$, $H_{a2}$) grow or shrink accordingly. At an applied electric field strength of 0.36 V/μm, corresponding to image 205 in the series, the two lower-energy ($H_a$) states coalesce leading to the formation of a thick boundary line 212 parallel to the device's rubbing direction. At this stage, it is no longer possible to electrically tune the defects.

Figure 4:
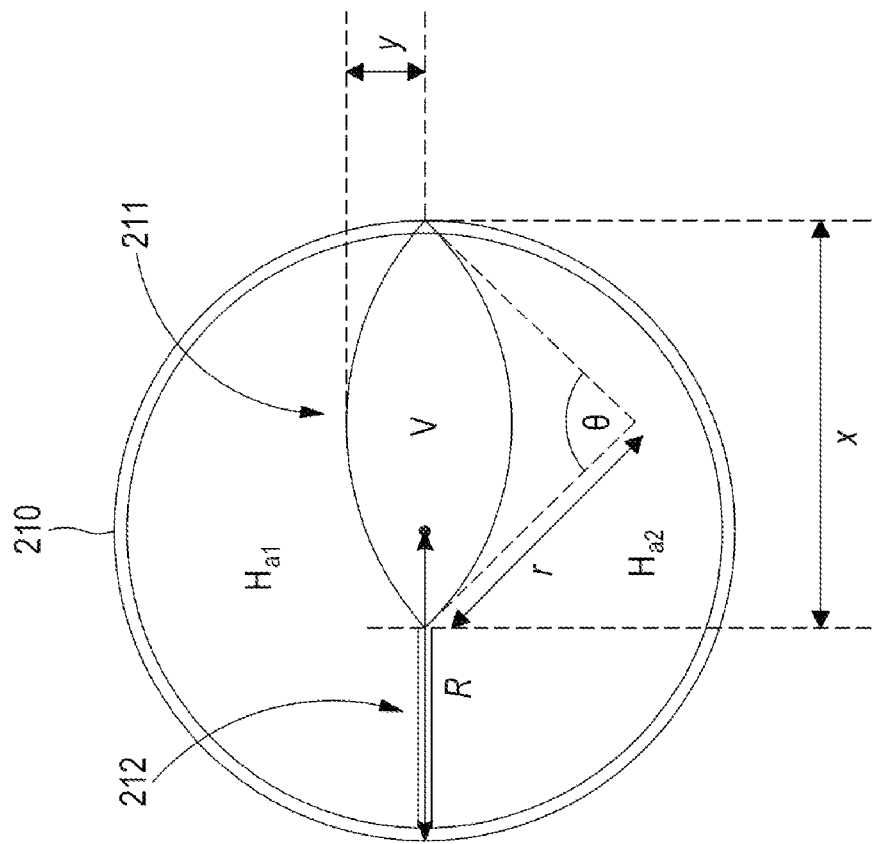
FIG. 4 shows a schematic illustrating the setup of the example embodiment of FIG. 3.
Figure 4:
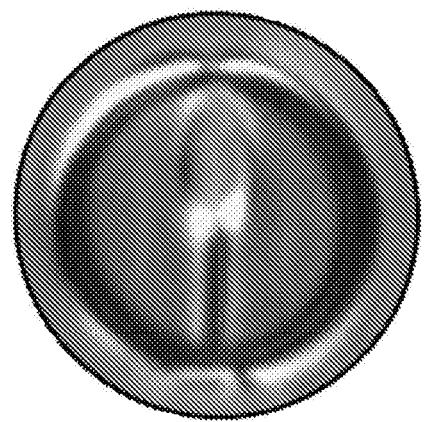

FIG. 4 shows a schematic, illustrating the device of FIG. 3, and set up to model the cylindrical polymeric structure locking in the H state. The cylinder encompasses the asymmetric H states, separated by the region of V state that grows under increasing electric field strengths. For a cylinder of radius R, the variable x can be in the range from 0 to 2R whilst y can vary from 0 to x/2 under the application of increasing electric field strengths.

Figure 5:
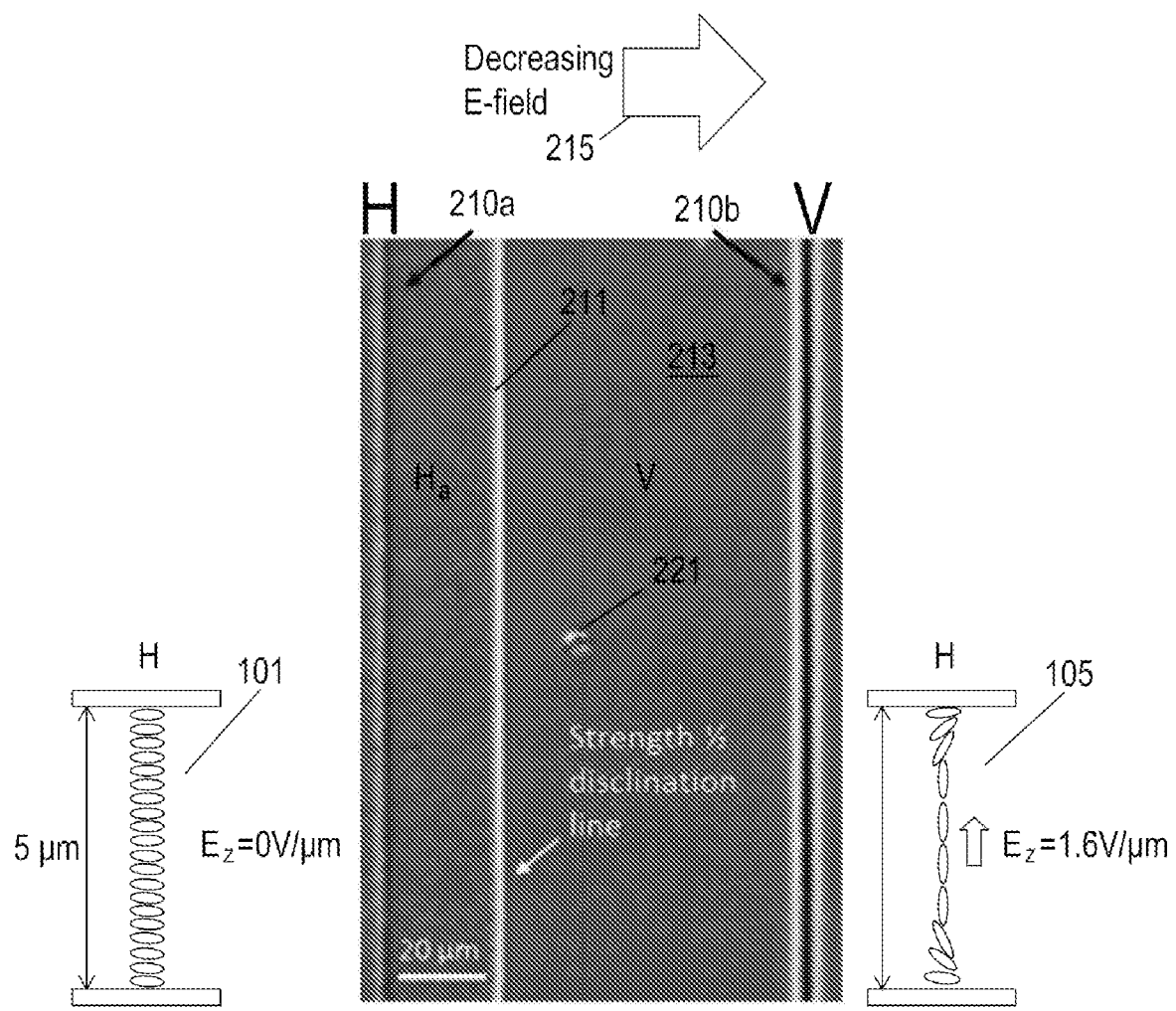
FIG. 5 shows an OPM image of an embodiment in which the polymeric structure comprises pseudo 1D-walls written in both the H (0 V/μm) and V (1.6 V/μm) states, illustrating adjusting the position of a defect line between the 1D-walls.

In a second example device (shown in FIG. 5), the polymeric structure comprises a first polymeric wall 210a, fabricated in the splayed ground (H) state in the absence of an electric field, and a second polymeric wall 210b written at a higher energy state, such as a V state. The first and second walls are substantially parallel, with a separation of 100 μm (although other separation distances can also be used, and the walls need not be parallel). FIG. 3 shows an OPM image with the director profiles corresponding with the first and second polymeric wall respectively on the left and right of the image in FIG. 5. The position of the disclination line 211 between the two structures can be varied according to the externally applied electric field, whereby the defect moves right as the electric field strength is decreased so that the bulk LC alignment is in the lowest energy ground (H) state. The feature 221 is a spacer bead, which is not essential, and is merely a convenient way of spacing apart the first and second substrate, between which the liquid crystal material 213 is disposed.

Figure 6:
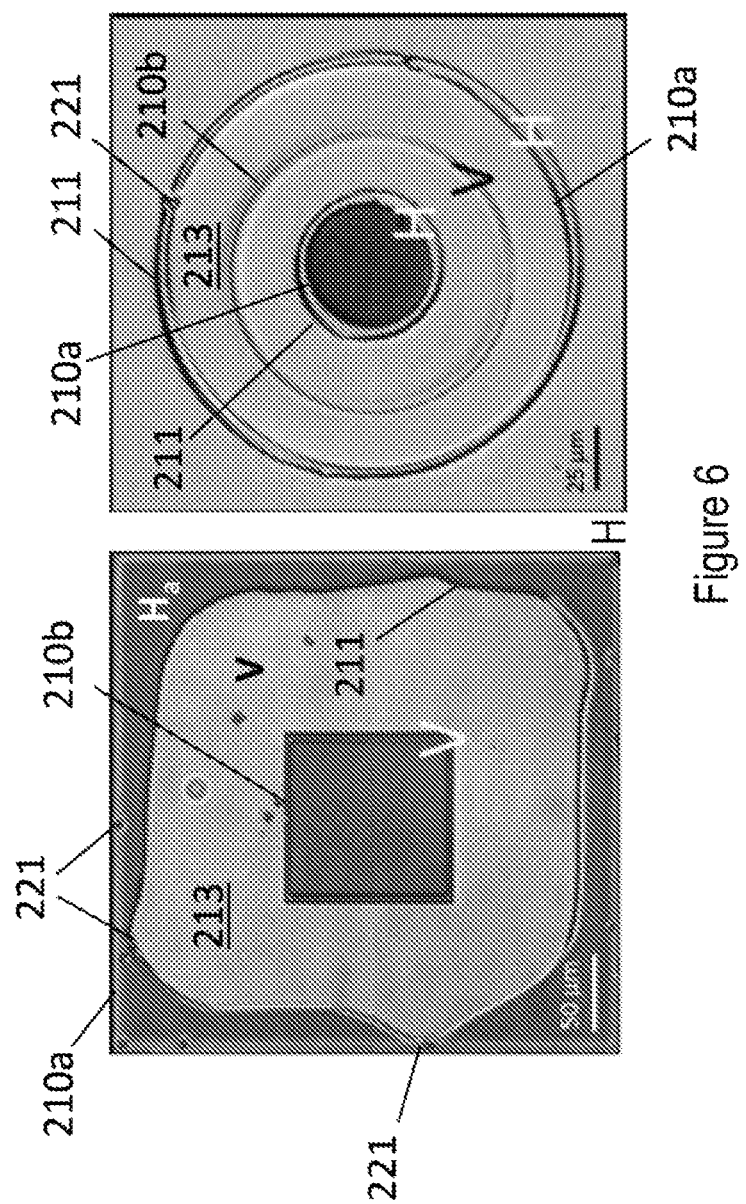
FIG. 6 shows OPM images of example embodiments with concentric polymer structures written in the H and V states.

In a third example device (shown in FIG. 6), the polymeric structure comprises concentric squares and rings locked in either the ground (H) or high-energy (V) state. For this third device, the electric field conditions were E=0 V/μm for ground (H) state, and E=1.6 V/μm for high-energy (V) state. FIG. 6 shows OPM images of the third example device. The defect 211 can be seen as it nucleates from the ground (H) state polymer square on the left-hand image of FIG. 6. Interference from spacer beads 221 (used to ensure a consistent device thickness in the manufacturing process) disrupts the movement of the defects 211. This can be avoided by engineering LC devices with spacer beads 221 dispersed at the edges of the substrate (e.g. in an adhesive bonded region) rather than in the device region.

Figure 7:
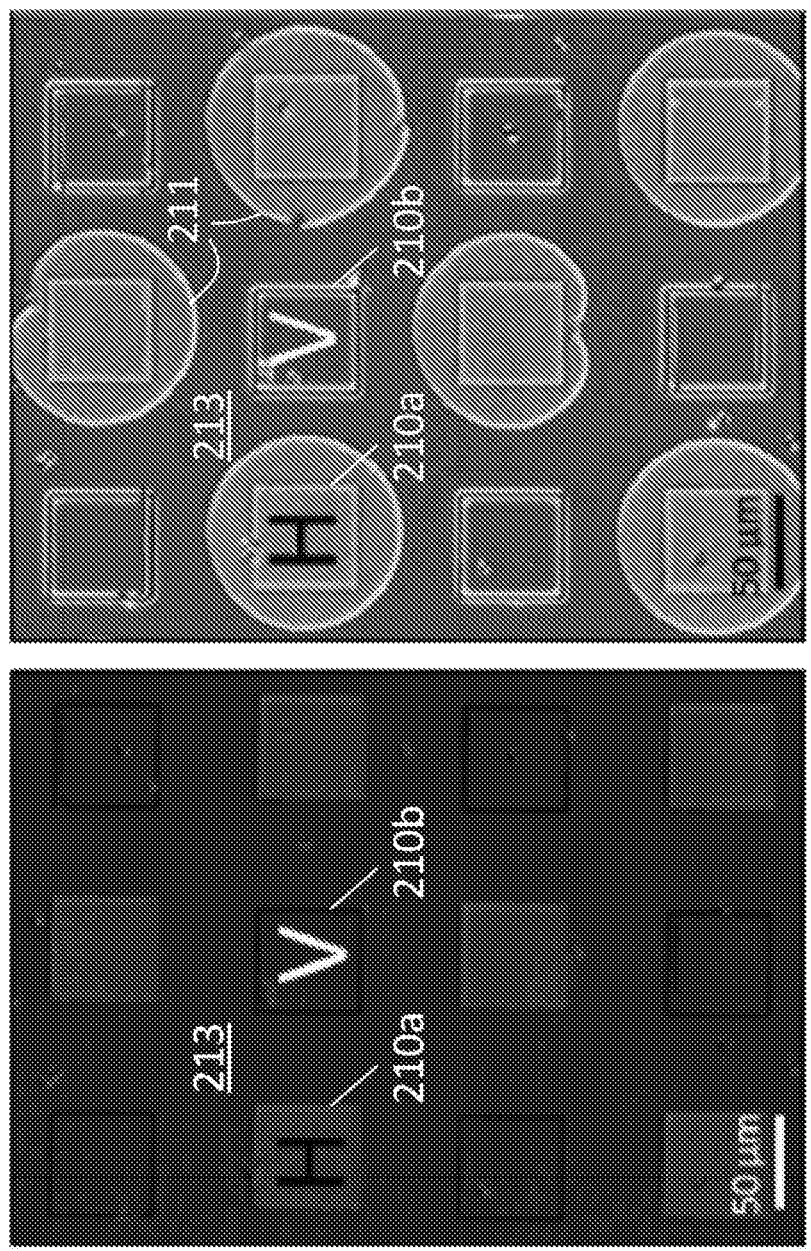
FIG. 7 shows an example embodiment in which the device comprises a checkerboard/array of square-shaped polymer structures written in the H and V states.

In a fourth example device (shown in FIG. 7), the polymeric structure 210 comprises an array or checkerboard of square shaped polymer cavities with alternate cavities written in the ground (H) and high-energy (V) states respectively (under the same electric field conditions mentioned above). FIG. 7 shows OPM images. In the left-hand image regions of liquid crystal material within the square-shaped polymer cavities that were written in the H state have collapsed into the lower-energy state ($H_{a1}$, $H_{a2}$), while the remainder of the bulk liquid crystal material is aligned in the high-energy arrangement (V) state.

This illustrates that the polymeric structures 210 make transition to a state closer to that locked into the polymeric structure 210 more energetically favourable. In the case of a polymeric structure 210 written in the ground state H, liquid crystal material (unpolymerised) in contact with the structure 210 will switch to an $H_a$ state from the V state on reduction of an electric field, when liquid crystal material that is not in contact with such a polymeric structure can only transition back to the H state via the T state.

In the right-hand image of FIG. 7, defects 211 are seen to nucleate out of the structures 210a written in the ground (H) state upon reducing the applied electric field (which is sufficiently high to initially drive the entire bulk device into the topologically discontinuous high-energy state (V)). The V state polymeric structures adjacent to the H state polymeric structures promote the formation of a defect on the exterior of the H state cavities, analogous to the defect shown in FIG. 3.

Figure 8:
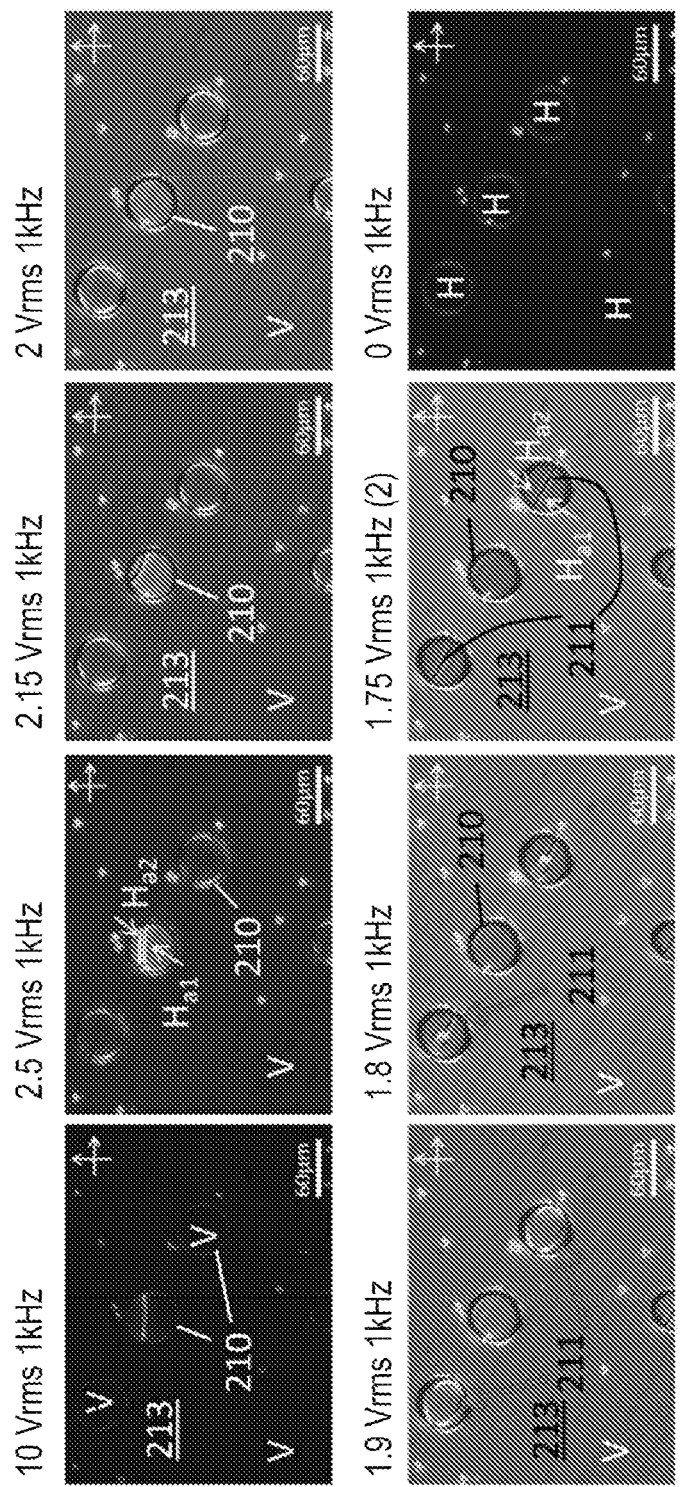
FIG. 8 shows a series of OPM images of 50 μm diameter polymeric cylinders between crossed polarisers.

FIG. 8 shows further OPM images of the first example device. The three 50 μm diameter polymeric cylinders are positioned between crossed polarisers as the applied electric field is reduced from 2 V/μm to 0 V/μm. A sudden voltage input decreases the transition time to the high-energy arrangement (V) state, and a residual domain wall can be seen in the central cylinder of FIG. 8, which upon reduction of the applied electric field promotes the collapse of the director field to the two lower-energy ($H_{a1}$, $H_{a2}$) states. The high-energy arrangement (V) alignment is retained elsewhere in the bulk liquid crystal material 213, yet a phase transition is initiated within the two other polymeric cylinders as the field is reduced further. The two lower-energy arrangement ($H_{a1}$, $H_{a2}$) states are energetically compatible with the polymeric structures that have locked in the ground (H) state, and consequently appear to emerge from the walls of the cylinders.

Figure 9:
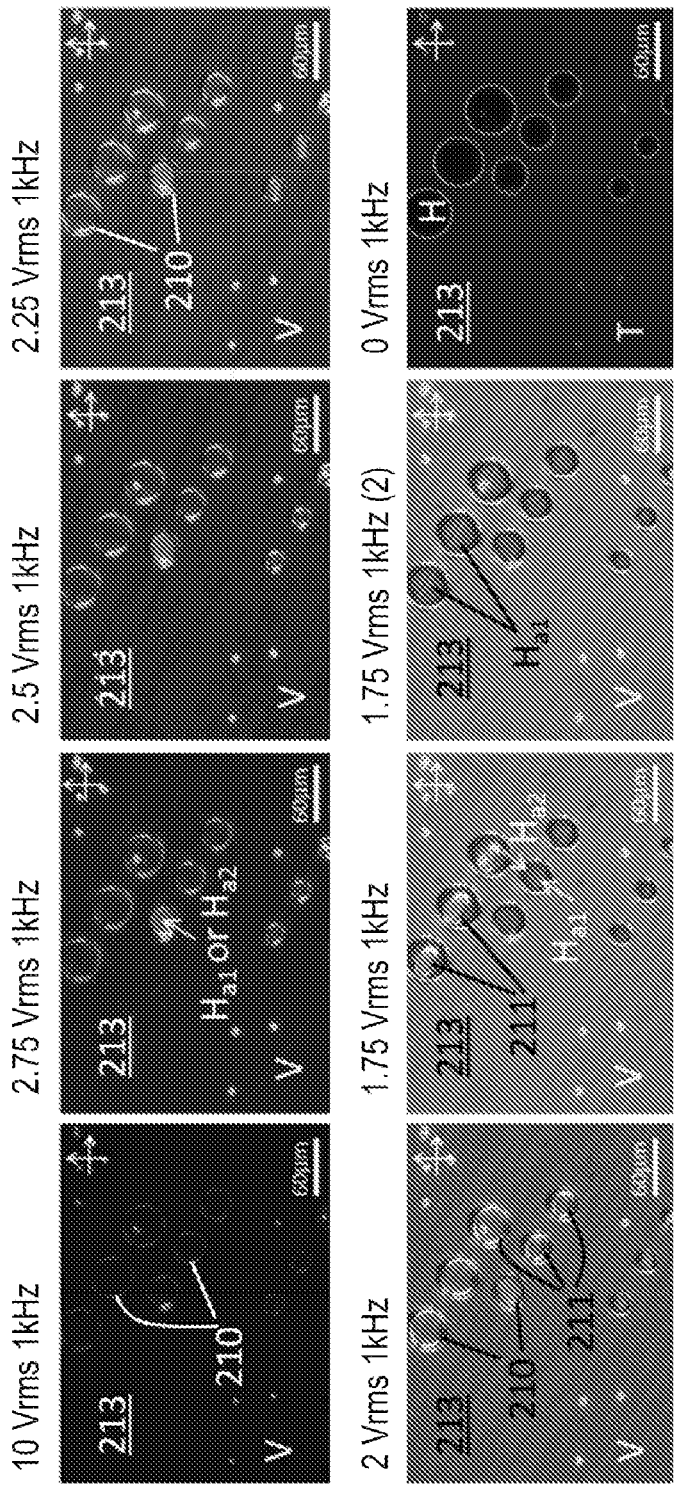
FIG. 9 shows a series of OPM images of 40, 30 and 20 μm diameter polymeric cylinders between crossed polarisers.

FIG. 9 shows OPM images of a fifth example device. This device comprises sets of 40, 30 and 20 µm diameter cylindrical polymeric structures, written in the ground (H) state. The OPM images were taken between crossed polarisers under the application of varying electric field strengths. The results demonstrate similar behaviour to that observed in FIG. 8 for the 50 µm diameter polymeric cylinders, with the alignment in some cylinders spontaneously collapsing to the lower-energy arrangement ($H_{a1}$, $H_{a2}$) states at higher voltages. It is clear from the sequence of images in FIG. 9 that the smaller diameter polymeric cylinders lead to the generation of defects and subsequent coalescence of the two lower-energy arrangement ($H_{a1}$, $H_{a2}$) states at higher electric fields than larger cylinders. However, the overall behaviour is consistent between the different sized structures indicating that, provided the diameter of the structure is at least twice the thickness of the liquid crystal material, a lower energy $H_a$ state may form within a closed loop polymeric structure written at the ground H state. The final image in the series shown in FIG. 9 was taken as soon as the electric field was removed in order to demonstrate the collapse of the bulk high-energy arrangement (V) alignment to the transient twist (T) state, while the regions of lower-energy arrangement ($H_{a1}$, $H_{a2}$) state enclosed within the polymeric structures instantly relax to the energetically favourable splayed ground (H) state.

The examples described above demonstrate the generation of electrically controllable defects arising from polymeric structures of varying shapes and sizes, which may readily be fabricated by direct laser writing in-situ in a nematic pi-cell device. The defects form as a consequence of the difference in elastic energy occurring at the phase transition between two topologically distinct states.

Figure 10:
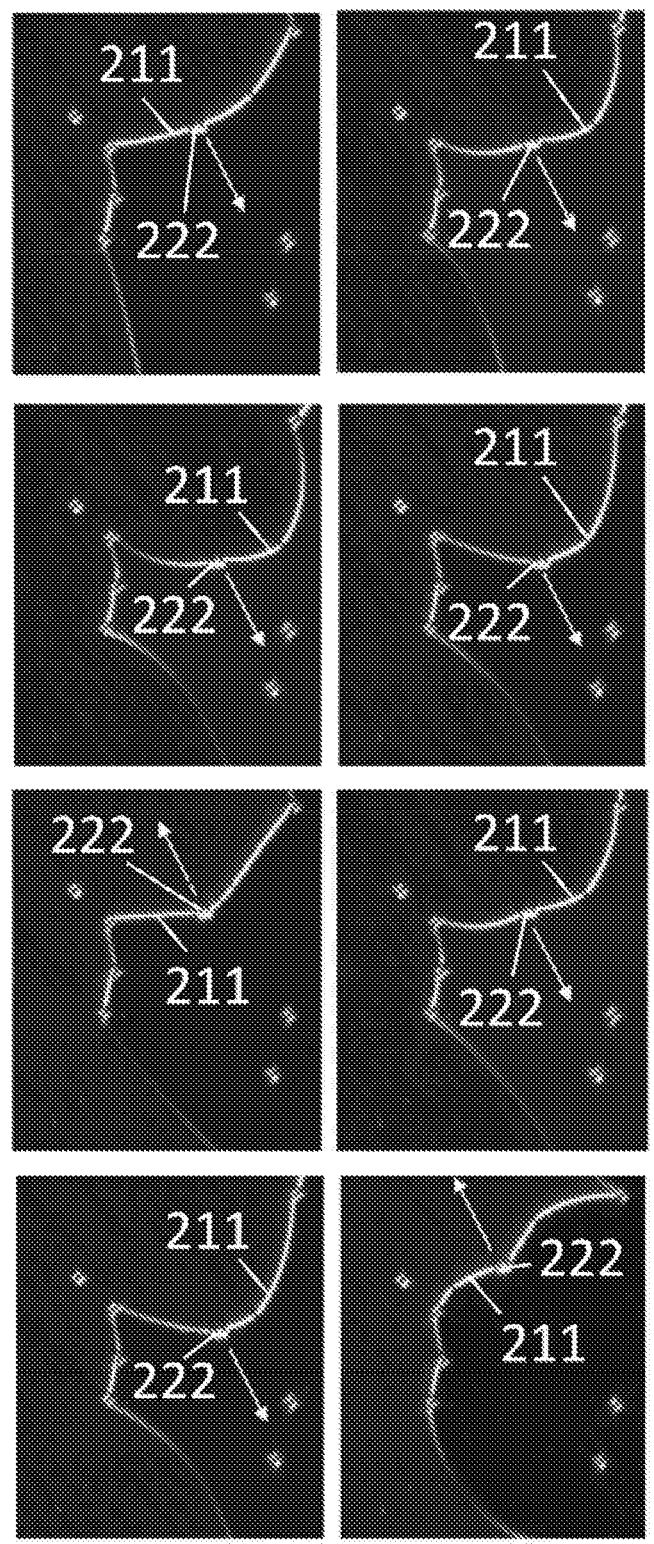
FIG. 10 shows a sequence of images, illustrating positioning of a suspended particle according to an embodiment.

FIG. 10 illustrates an example application of devices and methods according to an embodiment, in which particles suspended in the liquid crystal material are transported by the controllable movement of the defect (indicated by the arrows). The stationary particles seen in the surrounding bulk, and to which the disclination lines are pinned, are spacer beads that dictate the device thickness. The suspended particles may be colloidal. The colloidal particles may be microparticles or nanoparticles e.g. quantum dots. Colloidal particles of a similar density to their liquid crystal host tend to drift toward the strong distortion field associated with disclination lines. Thus, functionalised particles dispersed into a device according to an embodiment would tend to localise at the low energy defect sites, and the position of such particles could subsequently be controlled under an applied electric field (since the suspended particles would tend to follow the movement of the defect/disclination line). Potential applications for such colloidal systems may include generating switchable nanowires through the transportation of conductive particles in the liquid crystal matrix to form a micro-necklace at the defect site, or probing aggregation-induced fluorescence using photoluminescence measurements by moving colloids in-situ under the application of an electric field. Other potential uses may include microfluidics applications, photovoltaic applications, emissive applications (e.g. displays, lasers) depending upon the particular functionalisation of the particles.

Figure 11:
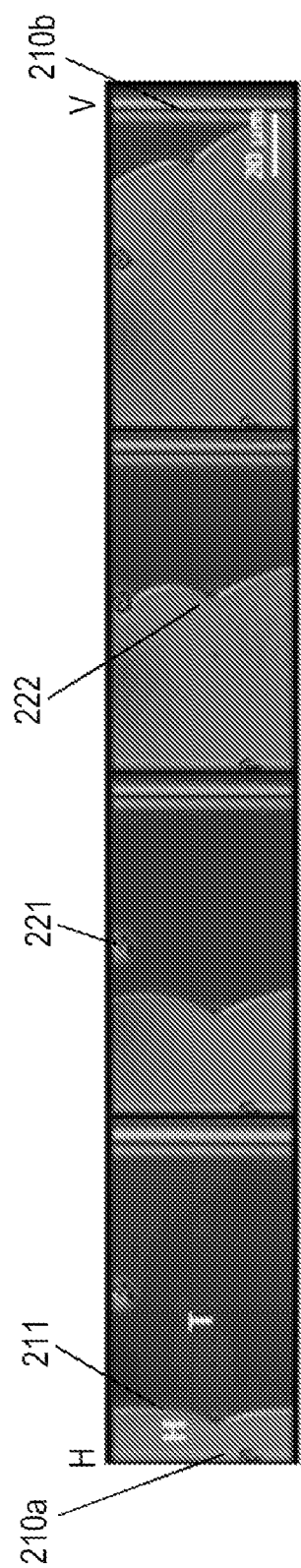
FIG. 11 shows a sequence of OPM images illustrating movement of a particle trapped within a defect.

FIG. 11 shows a sequence of OPM images, taken upon removal of an applied electric field, of a 1 µm-diameter silica bead 222 trapped within a defect between the H and V polymer walls. The position of the silica bead is dictated by the movement of the defect as the device relaxes into the lower energy ground H state (from left to right in the OPM image sequence).

From reading the present disclosure, other variations and modifications will be apparent to the skilled person. Such variations and modifications may involve equivalent and other features which are already known in the art of liquid crystal devices, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A method of electrically controlling state transition of a liquid crystal material in a device comprising the liquid crystal material and a polymeric structure consisting of polymerised liquid crystal material with a selected locked-in liquid crystal state in which liquid crystal molecules are unable to realign in response to an applied electric field, the method comprising:
    applying an electric field to the liquid crystal material to force the liquid crystal material into a high-energy state;
    reducing the strength of the electric field to cause a lower-energy state region of the liquid crystal material to nucleate on at least a part of the polymeric structure;
    wherein a defect separates the lower-energy state region from a region of the liquid crystal material having the high energy state; and the method further comprises controlling a position or a shape, or both a position and a shape, of the defect by modifying the strength of the applied electric field.

2. The method of claim 1, wherein the selected state is a ground state, or the ground state is an H, or splayed, state, or the selected state is a ground state and the ground state is an H, or splayed state.

3. The method of claim 1, wherein a defect separates the lower-energy state region from a region of the liquid crystal material having the high energy state and controlling the position or the shape of the defect comprises varying the relative proportions of liquid crystal material in a high-energy and the lower energy state, or both.

4. The method of claim 1, wherein the liquid crystal material comprises a nematic liquid crystal material, or a twisted nematic liquid crystal material, or a chiral nematic liquid crystal material, or a blue phase liquid crystal material, or a smectic-A liquid crystal material.

5. The method of claim 1, wherein the defect is one of a defect state in a nematic liquid crystal material, a defect state in a twisted nematic liquid crystal material, a defect state in a chiral nematic liquid crystal material, a defect state in a smectic-A liquid crystal material, a defect state in a blue phase liquid crystal material, a disclination line and a point defect.

6. The method of claim 1, wherein the high-energy arrangement of the liquid crystal material is a bend (V) state; or wherein the lower-energy arrangement of the liquid crystal material is one of two asymmetric splayed ($H_{a1}$, $H_{a2}$) states, or both.

7. The method of claim 1, wherein the polymerised liquid crystal is polymerised using either (i) photolithography or (ii) direct laser writing.

8. The method of claim 1, wherein at least part of the polymerised liquid crystal material is polymerised under the application of an electric field to lock in a high-energy state.

9. The method of claim 1, wherein the device is a pi-cell liquid crystal device.

10. The method of claim 1, further comprising moving and assembling micro or nano-particles, or both micro and nano-particles, suspended in the liquid crystal material using the defect.

11. The method of claim 10, wherein:
   i) the particles are electrically conducting, and moving the particles comprises forming a conductive path using the particles; or
   ii) the particles are chemically functionalised, and moving the particles comprises moving at least some of the particles to a reaction site where they participate in a chemical reaction; or
   iii) particle fluorescence is controlled by controlling the position aggregation of the particles;
   or any combination thereof.

12. A device comprising: liquid crystal material; at least one polymeric structure consisting of polymerised liquid crystal material with a selected locked-in liquid crystal state in which liquid crystal molecules are unable to realign in response to an applied electric field, electrodes for applying an electric field to the liquid crystal material, and a controller configured to:
   apply an electric field to the liquid crystal material using the electrodes to force the liquid crystal material into a high-energy state;
   reduce the strength of the electric field to cause a lower-energy state region of liquid crystal to nucleate on at least a part of the polymeric structure;
   wherein a defect separates the lower-energy state region from a region of the liquid crystal material having the high-energy state; and the controller is configured to control a position or a shape, or both a position and a shape, of the defect by modifying the strength of the applied electric field.

13. The device of claim 12, wherein the liquid crystal material is a nematic liquid crystal material, or a twisted nematic liquid crystal material, or a chiral nematic liquid crystal material, or a blue phase liquid crystal material, or a smectic-A liquid crystal material.

14. The device of claim 12, wherein the liquid crystal material is configured to be polymerisable, and the polymerised liquid crystal material is the same type of material as the liquid crystal material except that the polymerised liquid crystal material is polymerised and the liquid crystal material is not polymerised.

15. The device of claim 14, wherein the polymerised liquid crystal device is polymerised by either (i) photolithography or (ii) direct laser writing of the liquid crystal material, and optionally or preferably wherein the direct laser writing is aberration-corrected direct laser writing.

16. The device of claim 14, wherein the polymerised liquid crystal material comprises polymeric structures that fully extend through the thickness of the liquid crystal material or wherein the polymerised liquid crystal material comprises polymeric structures that partially extend through the thickness of the liquid crystal material, or both.

17. The device of claim 12, comprising a two dimensional array of polymeric structures, wherein each row of the array comprises an alternating sequence of a first selected state and a second selected state, and each column of the array comprises an alternating sequence of the first selected state and the second selected state, wherein the first state is a high energy state, and the second state is a lower energy state.

18. The device of claim 12, further comprising micro or nano-particles, or both micro and nano-particles, suspended in the liquid crystal material that are configured to be transported by movement of the defect.

19. The device of claim 18, wherein:
   i) the particles comprise conducting particles;
   ii) the particles comprise chemically functionalised particles, and the device is configured to transport the chemically functionalised particles to a site where they participate in a chemical reaction; and/or
   iii) wherein particle fluorescence is controlled by controlling the position and/or aggregation of the particles.

20. A spatial light modulator, comprising the device of claim 12, wherein the position or the shape, or both the position and the shape, of the defect controls the degree of phase modulation, polarisation modulation or amplitude modulation imparted by the spatial light modulator.

* * * * *